(12) United States Patent
Matsushita et al.

(10) Patent No.: US 10,860,235 B2
(45) Date of Patent: Dec. 8, 2020

(54) STORAGE SYSTEM HAVING A PLURALITY OF STORAGE APPARATUSES WHICH MIGRATE A FIRST VOLUME GROUP TO A SECOND VOLUME GROUP

(71) Applicant: Hitachi, Ltd., Tokyo (JP)

(72) Inventors: Koki Matsushita, Tokyo (JP); Toru Suzuki, Tokyo (JP); Takahito Sato, Tokyo (JP); Atsushi Oku, Tokyo (JP)

(73) Assignee: HITACHI, LTD., Tokyo (JP)

( * ) Notice: Subject to any disclaimer, the term of this patent is extended or adjusted under 35 U.S.C. 154(b) by 27 days.

(21) Appl. No.: 16/354,375

(22) Filed: Mar. 15, 2019

(65) Prior Publication Data

US 2020/0019334 A1    Jan. 16, 2020

(30) Foreign Application Priority Data

Jul. 13, 2018   (JP) .................................. 2018-133731

(51) Int. Cl.
   *G06F 3/06*   (2006.01)
(52) U.S. Cl.
   CPC .......... *G06F 3/0647* (2013.01); *G06F 3/0604* (2013.01); *G06F 3/0644* (2013.01); *G06F 3/0683* (2013.01)
(58) Field of Classification Search
   None
   See application file for complete search history.

(56) References Cited

U.S. PATENT DOCUMENTS

| 9,229,869 | B1 * | 1/2016 | Parakh | G06F 12/084 |
| 2007/0233700 | A1 | 10/2007 | Tomonaga | |
| 2007/0260840 | A1 * | 11/2007 | Watanabe | G06F 3/0665 |
| | | | | 711/165 |
| 2015/0234618 | A1 * | 8/2015 | Miwa | G06F 3/0608 |
| | | | | 711/165 |
| 2016/0019145 | A1 * | 1/2016 | Mimata | G06F 3/0613 |
| | | | | 711/119 |
| 2016/0364170 | A1 * | 12/2016 | Nasu | G06F 3/0685 |
| 2018/0241825 | A1 * | 8/2018 | Bolton | H04L 67/42 |

FOREIGN PATENT DOCUMENTS

JP           6234557 B2     11/2017

* cited by examiner

*Primary Examiner* — Tracy C Chan
(74) *Attorney, Agent, or Firm* — Mattingly & Malur, PC

(57) ABSTRACT

The first to third storage apparatuses each comprise an SVOL1, SVOL2 and PVOL. Even when the write command designates any of the PVOL, SVOL1 and SVOL2, at least one of the first to third storage apparatuses writes write target data according to the write command to the PVOL and then writes the write target data in parallel to the SVOL1 and SVOL2. Even if a read command designates any of the PVOL, SVOL1 and SVOL2, at least one of the first to third storage apparatuses reads read target data according to the read command from the PVOL.

9 Claims, 13 Drawing Sheets

FIG.6A

RESOURCE MANAGEMENT TABLE
2310

| RESOURCE TYPE | RESOURCE ID | RESOURCE GROUP ID | VIRTUAL RESOURCE ID |
|---|---|---|---|
| VOLUME | VOL1 | RSG1 | VOL11 |
| HOST GROUP | HG1 | RSG1 | - |
| PORT | PT1 | RSG1 | - |
| ... | ... | ... | ... |

HOST GROUP MANAGEMENT TABLE
2380

| PORT ID | HOST GROUP ID | HOST MODE | HOST WWN | VOLUME ID |
|---|---|---|---|---|
| PT1 | HG1 | OS X | 10000060B0C07395 | VOL11 |
| ... | ... | ... | ... | ... |

VIRTUAL STORAGE BOX MANAGEMENT TABLE
2320

| VIRTUAL STORAGE BOX ID | RESOURCE GROUP ID |
|---|---|
| VBOX1 | RSG1 |
| ... | ... |

VIRTUAL STORAGE MANAGEMENT TABLE
2330

| VIRTUAL STORAGE ID (2331) | VIRTUAL STORAGE BOX ID (2332) |
|---|---|
| ST1 | VBOX1 |
| ... | ... |

FIG.9A

VOLUME COPY PAIR MANAGEMENT TABLE
2340

| PAIR ID (2341) | PAIR TYPE (2342) | PAIR STATE (2343) | PVOLID (2344) | SVOLID (2345) | RELATED PAIR ID (2346) | PRIORITY RANKING (2347) |
|---|---|---|---|---|---|---|
| PR1 | HA-MLT | PAIR | ST1.VOL1 | ST2.VOL2 | PR2 | FIRST |
| PR2 | HA-MLT | COPY | ST1.VOL1 | ST3.VOL3 | PR1 | SECOND |
| ... | ... | ... | ... | ... | ... | ... |

FIG.9B

EXCLUSION LOCK MANAGEMENT TABLE
2390

| EXCLUSION LOCK ID (2391) | VOLUME ID (2392) | LBA (2393) |
|---|---|---|
| EL1 | VOL1 | xx-xx |
| ... | ... | ... |

STORAGE SYSTEM HAVING A PLURALITY OF STORAGE APPARATUSES WHICH MIGRATE A FIRST VOLUME GROUP TO A SECOND VOLUME GROUP

CROSS-REFERENCE TO PRIOR APPLICATION

This application relates to and claims the benefit of priority from Japanese Patent Application number 2018-133731, filed on Jul. 13, 2018 the entire disclosure of which is incorporated herein by reference.

BACKGROUND

The present invention generally relates to a storage system and more particularly to migration of volume groups in a storage system.

As background art, there exists PTL 1. PTL 1 discloses a 'storage system which comprises a plurality of storage apparatuses which perform migration from a pre-migration volume group to a post-migration volume group, wherein, during the migration, the plurality of storage apparatuses receive a write command from a host to an optional volume among the plurality of volumes of the pre-migration volume group and post-migration volume group, wherein the plurality of storage apparatuses write write data of the write command in a predetermined order to each of the plurality of volumes, wherein a first storage apparatus of the plurality of storage apparatuses writes the write data to a final volume which is final among the plurality of volumes, and wherein a storage apparatus which provides a different volume from the final volume in the plurality of storage apparatuses writes the write data after performing an exclusion lock in each of the different volumes and cancels the exclusion lock after the writing of the write data to the final volume is complete.

[PTL 1] Japanese Patent Publication No. 6234557.

SUMMARY

In enterprise-class storage systems, High Availability (HA) functions derived from a storage-apparatus cluster configuration are in demand. An HA function realizes high availability of a storage system. An HA configuration has duplicate channels and automatically isolates the failed channel when failure has occurred and continues the operation by using only the normal channel.

In addition, an active-active-type HA configuration uses all channels as working-type channels. In an active-active-type HA configuration, a storage system also receives I/O (Input/Output) access to any volume pair.

In data migration in an active-active-type HA configuration storage system, there is a demand for data to be migrated while maintaining non-stoppage of the host I/O and an active-active-type HA configuration. In other words, there is a demand for data migration while maintaining the high availability of the active-active-type HA configuration.

It is assumed that, as volume groups according to an active-active-type HA configuration, there exist first and second volume groups which comprise a plurality of physical volumes which are based on virtual volumes. The first volume group is a group which comprises a PVOL (primary physical volume) and an SVOL1 (first secondary physical volume) which can both be designated by an I/O command, and which is a group in which data is synchronized between physical volumes in the group. The second volume group is a group which comprises a PVOL and an SVOL2 (second secondary physical volume) which can both be designated by an I/O command, and which is a group in which data is synchronized between physical volumes in the group. The first volume group is a migration source and the second volume group is a migration destination.

When the write destination according to a received write command is any of the PVOL, SVOL1 and SVOL2, high-speed processing of the write command can be expected by writing the write target data in parallel to the PVOL, SVOL1 and SVOL2. However, the write target data need not necessarily be written to all of the PVOL, SVOL1 and SVOL2 simultaneously. For this reason, data which has been read from any one of the PVOL, SVOL1 and SVOL2 for a certain address in the foregoing virtual volume (an LBA (Logical Block Address), for example) and data which is subsequently read from any other one of the PVOL, SVOL1 and SVOL2 at the same address may differ, that is, so-called data corruption can occur, for example.

In a storage system, a first storage apparatus comprises the SVOL1, a second storage apparatus comprises the SVOL2, and a third storage apparatus comprises the PVOL. Even if a write command designates any of the PVOL, SVOL1 and SVOL2, at least one of the first to third storage apparatuses writes write target data according to the write command to the PVOL and then writes the write target data in parallel to the SVOL1 and SVOL2. Even if a read command designates any of the PVOL, SVOL1 and SVOL2, at least one of the first to third storage apparatuses reads read target data according to the read command from the PVOL.

Even if writing is performed in parallel to the PVOL, SVOL1, and SVOL2, it is possible to prevent so-called data corruption from occurring.

BRIEF DESCRIPTION OF THE DRAWINGS

FIG. 6A is a diagram showing a configuration example of a resource management table.

FIG. 6B is a diagram showing a configuration example of a host group management table.

FIG. 7 is a diagram showing a configuration example of a virtual storage box management table.

FIG. 8 is a diagram showing a configuration example of a virtual storage management table.

FIG. 9A is a diagram showing a configuration example of a volume copy pair management table.

FIG. 9B is a diagram showing a configuration example of an exclusion lock management table.

DESCRIPTION OF EMBODIMENTS

Figure 1:
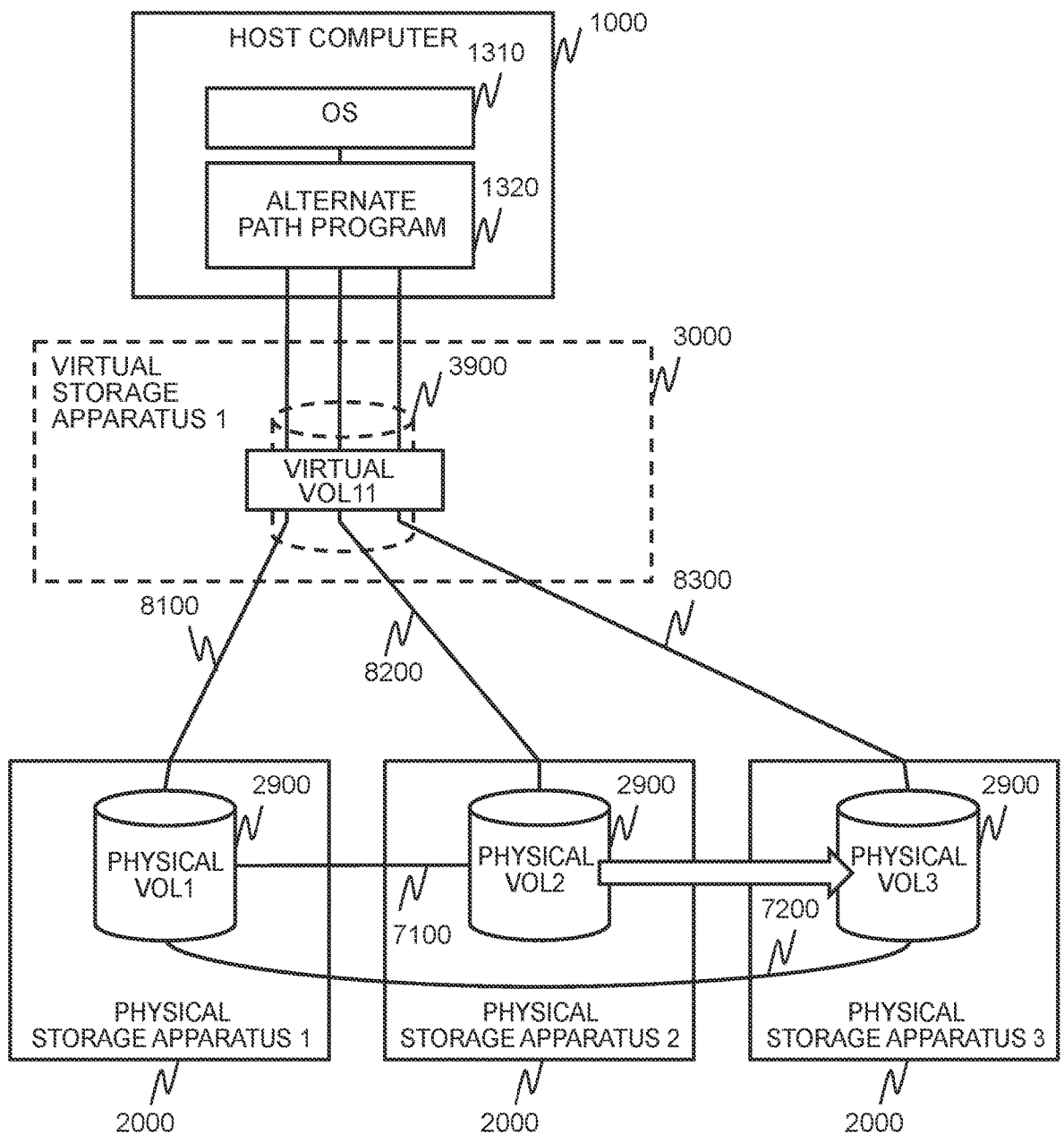
FIG. 1 is a diagram providing an overview of volume pair migration in an HA multi-target configuration.

In the ensuing explanation, 'interface unit' may refer to one or more interfaces. The one or more interfaces may be one or more communication interface devices of the same type (for instance, one or more NIC (Network Interface Cards)) or may be two or more communication interface devices of different types (for instance, an NIC and an HBA (Host Bus Adapter)).

Furthermore, in the ensuing explanation, 'memory unit' may be one or more memories and may, typically, be a main storage device.

Furthermore, in the ensuing explanation, 'storage device units' may be one or more storage devices and may, typically, be an auxiliary storage device. 'Storage device' means a physical storage device (Physical storage DEVice) in particular and is typically a nonvolatile storage device.

Furthermore, in the ensuing explanation, 'storage unit' is at least one of a memory unit and at least a portion of a storage device unit (typically, at least a memory unit).

Furthermore, in the ensuing explanation, 'processor unit' is one or more processors. At least one processor is typically a microprocessor like a CPU (Central Processing Unit) but could also be another type of processor such as a GPU (Graphics Processing Unit). At least one processor could also be a single-core or multi-core processor. At least one processor could also be a processor in a broader sense such as a hardware circuit which performs some or all of the processing (an FPGA (Field-Programmable Gate Array) or ASIC (Application Specific Integrated Circuit), for example).

Moreover, although information for which an output is obtained in response to an input is explained in the ensuing explanation by using expressions such as 'xxx table,' information of this type could also be data of any structure or could be a learning model such as a neural network which generates an output in response to an input. Therefore, 'xxx table' can be referred to as 'xxx information.' Moreover, in the ensuring explanation, the configuration of each table is an example, and one table could also be divided into two or more tables, or all or a portion of two or more tables could also be one table.

Furthermore, in the ensuing explanation, although processing is explained with the 'program' serving as the subject, determined processing is performed as a result of a program being executed by a processor unit while suitably using a storage unit and/or an interface unit, and the like, and hence the subject of the processing may be a processor unit (or a device such as a controller which comprises the processor unit). A program could also be installed on an apparatus like a computer, from a program source. A program source could be a program distribution server or a computer-readable (for example, a non-temporary) recording medium, for example. Furthermore, in the ensuing explanation, two or more programs could be implemented as one program or one program could be implemented as two or more programs.

Furthermore, in the ensuing explanation, the 'storage system' is configured from a plurality of physical storage apparatuses but at least one of this plurality of physical storage apparatuses could also be a general-purpose computer. SDx (Software-Defined anything) may be constructed in the general-purpose computer or in a system which comprises this physical computer as a result of the at least one general-purpose computer executing predetermined software. As SDx, SDS (Software Defined Storage) or SDDC (Software-defined Datacenter), for example, can be adopted. For example, an SDS storage apparatus may be constructed as a result of software which comprises a storage function being executed by a general-purpose computer.

Furthermore, in the ensuing explanation, the 'physical VOL' is a volume which form an HA pair and may be a logical storage device (address space, for example). The physical volume may be a tangible volume which is based on physical storage resources which the storage system comprises (one or more storage devices, for example) or may be a virtual volume conforming to virtualization technology (Thin Provisioning, for example).

An embodiment of the present invention will be explained hereinbelow with reference to the drawings. This embodiment is merely an example for realizing the present invention and it should be noted that same does not limit the technological scope of the present invention. The same reference signs have been assigned to common configurations in the drawings.

The storage system explained hereinbelow has an active-active-type HA configuration. An HA configuration has duplicate channels and comprises an automatic failure recovery function for automatically isolating the failed channel when failure has occurred and continuing the operation by using only the normal channel. An active-active-type HA configuration implements the effective application and load distribution of resources by using all channels as working-type channels. In the following explanation, HA configurations and HA pairs signify active-active-type HA configurations and HA pairs. The storage system also receives I/O access to any of the HA pairs.

In the ensuing explanation, HA pair migration is explained. More specifically, HA pair migration migrates one of the pre-migration HA pairs to another volume and configures a post-migration HA pair by means of the other of the pre-migration HA pairs and a new volume. The storage system receives I/O access to all of the volumes during migration. The storage system switches the HA pair after migration is complete. Note that an HA pair is an example of a volume group which has an active-active-type HA configuration. A pre-migration HA pair is an example of a first volume group which is a migration source. A post-migration HA pair is an example of a second volume group which is a migration destination. Note that an 'active-active-type HA configuration volume group' is a group which comprises two or more physical volumes which can all be designated by an I/O (Input/Output) command, and which is a group in which data is synchronized between physical volumes in the group.

An HA pair is configured from a Primary Volume (PVOL) and a Secondary Volume (SVOL). In one example, a storage system copies data of a PVOL to an SVOL at the time of pair creation.

When no migration is taking place, upon receiving a WRITE command to write to the SVOL, the storage system finishes writing write data to the PVOL (either writing to a write cache or writing to a storage drive) and then performs writing of write data to the SVOL. In one example, I/O access to the PVOL is accompanied by a PVOL exclusion lock, while the exclusion lock is not used in I/O access to the SVOL. The exclusion lock could also be used in accessing the SVOL.

During migration, as far as write processing is concerned, the exclusion lock for the PVOL prohibits other write processing and read processing but the exclusion lock for the SVOL prohibits other write processing but does not prohibit read processing. The exclusion lock in read processing prohibits other write processing and may or may not prohibit other read processing. The exclusion lock in read processing enables suppression of a delayed response to the host by allowing other read processing.

FIG. 1 is a diagram providing an overview of an HA multi-target configuration in volume migration. According to the example in FIG. 1, the HA multi-target configuration takes one volume as a PVOL which is common to two HA pairs and forms two HA pairs from these three volumes.

The system in FIG. 1 comprises a host computer 1000, a physical storage apparatus (also referred to simply as storage apparatus) 2000, and a virtual storage apparatus 3000. The virtual storage apparatus 3000 is based on a plurality of physical storage apparatuses 2000 which form the storage system.

This system has an active-active-type HA configuration (hereinafter also called an HA volume configuration) configured from a plurality of physical storage apparatuses 2000. The plurality of physical storage apparatuses 2000 are provided to the host computer 1000 as a single virtual storage apparatus 3000. The physical storage apparatuses 2000 each provide the same storage apparatus configuration information, that is, the configuration information of the virtual storage apparatus 1 (3000) in response to a request from the host computer 1000.

In the example of FIG. 1, a physical VOL1 (2900) of a physical storage apparatus 1 (2000) and a physical VOL2 (2900) of a physical storage apparatus 2 (2000) form the HA pair 7100. The physical VOL1 (2900) is a PVOL and the physical VOL2 (2900) is an SVOL.

The same VOL information, that is, information of a virtual VOL11 (3900) is provided to the host computer 1000 for the physical VOL1 (2900) and physical VOL2 (2900). The host computer 1000 executes an OS (Operating System) 1310 and an exchange path program 1320 and accesses the virtual VOL11 (3900). Therefore, the host computer 1000 is able to use both a path 8100 to the physical VOL1 (2900) and a path 8200 to the physical VOL2 (2900) by means of the exchange path program 1320.

Write data to one physical VOL2900 is transferred to the other physical VOL2900. As a result, data uniformity between the physical VOL1 (2900) and physical VOL2 (2900) is maintained.

Thus, the physical VOL1 (2900) and physical VOL2 (2900) are able to perform I/O access as one volume from the host computer 1000 and even if failure should occur in either physical volume, I/O access to the other physical volume is possible.

This embodiment explains migration of a volume pair for which non-stoppage of the host I/O and an active-active-type HA configuration have been maintained. By way of example, an example in which the physical VOL2 (2900) is migrated to a physical VOL3 will be explained. The physical VOL1 and physical VOL2 form a pre-migration volume pair and the physical VOL1 (2900) and physical VOL3 (2900) form a post-migration volume pair.

First, an HA pair 7200 is formed by the physical VOL1 (2900) and physical VOL3 (2900). Here, the physical VOL1 (2900) is a PVOL and the physical VOL3 (2900) is an SVOL. In the migration, data is copied from the physical VOL1 (2900) which is the PVOL to the physical VOL3 (2900) which is the SVOL.

A path 8300 from the host computer 1000 to the physical VOL3 (2900) is defined in the host computer 1000 and a physical storage apparatus 3 (2000). The physical storage apparatus 3 (2000) sends back information of the virtual VOL11 (3900) like the physical VOL1 (2900) and physical VOL2 (2900) in response to a request from the host computer 1000, to the physical VOL3 (2900).

The path 8200 from the host computer 1000 to the physical VOL2 (2900) is then deleted in the host computer 1000 and physical storage apparatus 2 (2000). Moreover, the physical storage apparatus 1 (2000) and physical storage apparatus 2 (2000) delete the HA pair 7100. As a result, the migration from the physical VOL2 (2900) of the physical storage apparatus 2 (2000) to the physical VOL3 (2900) of the physical storage apparatus 3 (2000) is complete.

Figure 2:
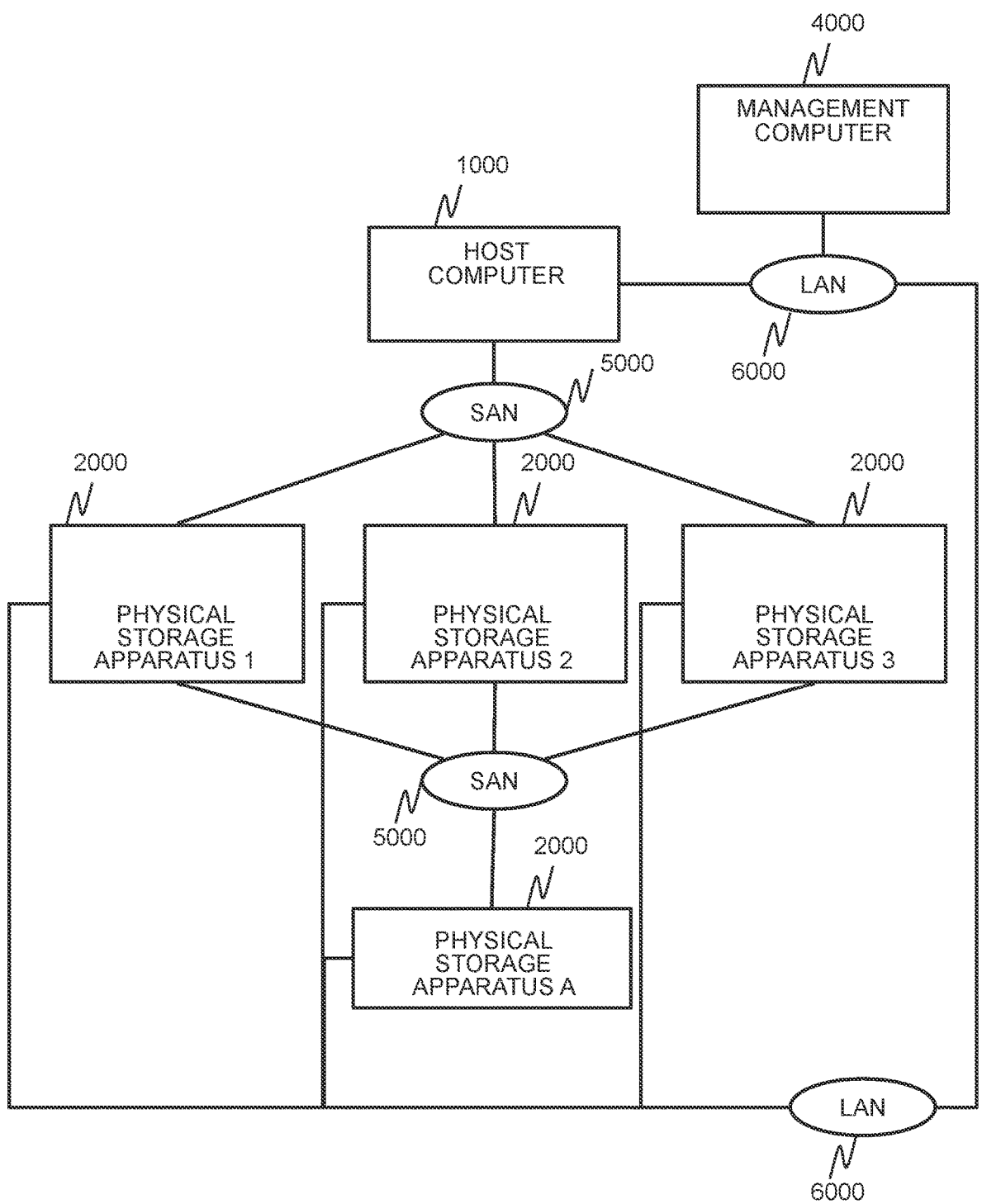
FIG. 2 is a diagram showing a configuration example of a computer system.

FIG. 2 shows a configuration example of a computer system according to the embodiment. The computer system in FIG. 2 comprises the host computer 1000, the physical storage apparatuses 2000, and a management computer 4000.

The number of the various apparatuses (systems) included in the computer system depends on the design. The physical storage apparatuses 1 to 3 (2000) form a virtual storage apparatus which is a single virtual storage apparatus. In the virtual storage environment of this example, two or three physical storage apparatuses form one virtual storage and the number of physical storage apparatuses forming the virtual storage depends on the design.

A physical storage apparatus A (2000) carries a Quorum Disk. The Quorum Disk provides a function for determining which among the physical storage apparatuses 2000, from which an HA configuration is formed, to make continuously work and which to stop when communication has broken down between the physical storage apparatuses 2000 in the HA configuration. Split brain problems can be prevented by means of a Quorum Disk.

The host computer 1000, management computer 4000, and physical storage apparatuses 2000 are communicably coupled by means of a management network which is configured from a LAN 6000. For example, the management network 6000 is an IP network. The management network 6000 may be a network of any type as long as same is a network for the communication of management data.

The host computer 1000 and physical storage apparatuses 2000 are coupled by means of a data network which is configured from a SAN (Storage Area Network) 5000. The host computer 1000 accesses the volumes of the physical storage apparatuses 2000 via the SAN 5000. The data network 5000 may be a network of any type as long as same is a network for data communications. The data network 5000 and management network 6000 could also be the same network.

Figure 3:
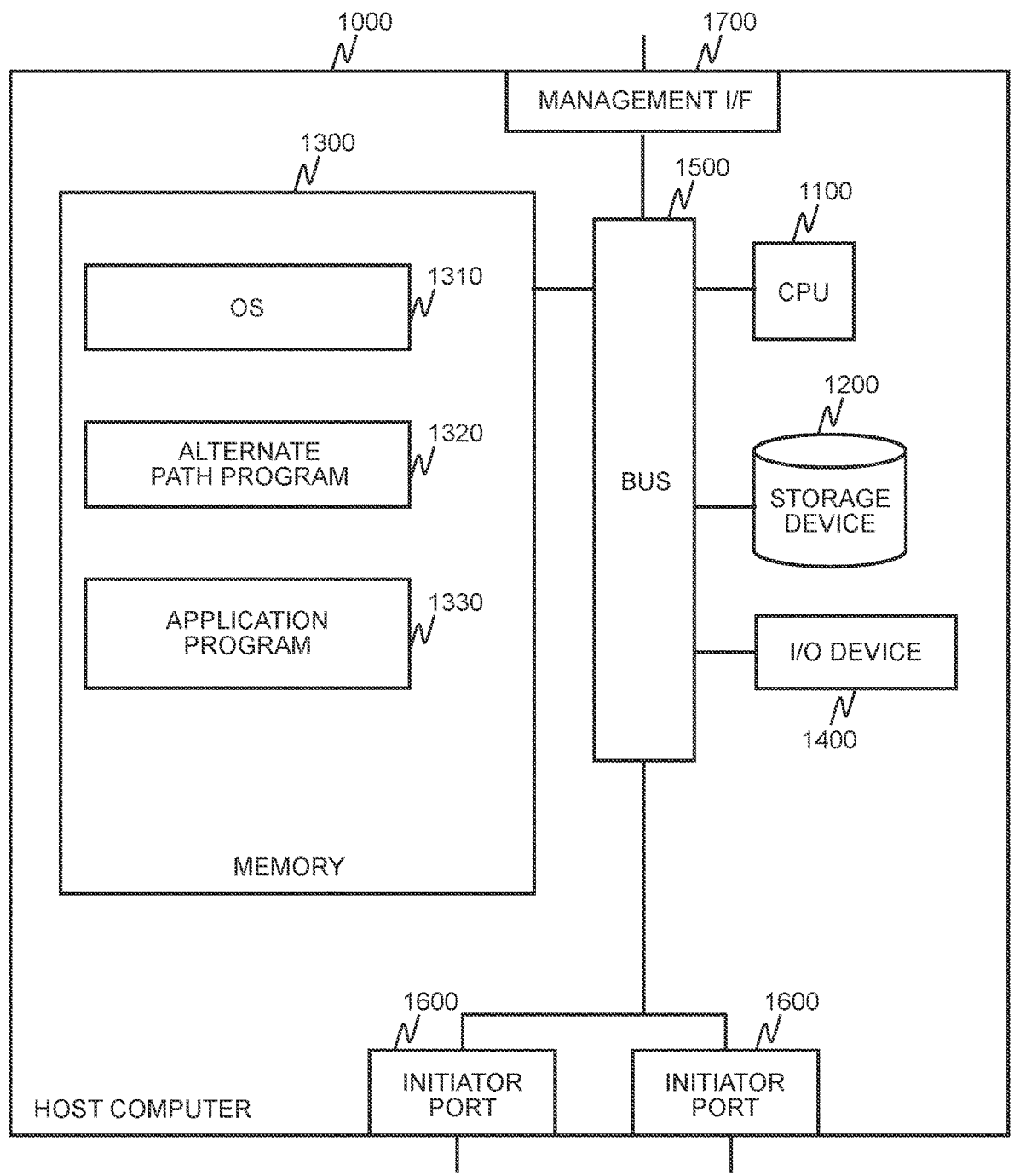
FIG. 3 is a diagram showing a configuration example of a host computer.

FIG. 3 is a schematic view of a configuration example of the host computer 1000. The host computer 1000 comprises a CPU (Central Processing Unit) 1100 which is a processor, a nonvolatile secondary storage device 1200, a memory 1300 which is a main storage device, an input/output device 1400, an initiator port 1600 which is an interface on the I/O request issuing side, and a management interface (management I/F) 1700. The constituent elements are each communicably coupled by means of a bus 1500.

The CPU 1100 operates according to a program which is stored in the memory 1300. Typically, the programs and data which are stored in the secondary storage device 1200 are loaded into the memory 1300. In this example, the memory 1300 holds the OS (Operating System) 1310, the exchange path program 1320 and the application program 1330. The application program 1330 performs reading/writing of data from/to the volumes provided by the physical storage apparatuses 2000.

The initiator port 1600 is a network interface which is coupled to the SAN 4000. The initiator port 1600 sends and receives data and requests to/from the physical storage apparatuses 2000 via the SAN 5000.

The management interface 1700 is a network interface which is coupled to the LAN 6000. The management interface 1700 sends and receives management data and control instructions to/from the physical storage apparatuses 2000 via the LAN 6000. The management interface 1700 also sends and receives management data and control instructions to/from the management computer 4000 via the LAN 6000.

Figure 4:
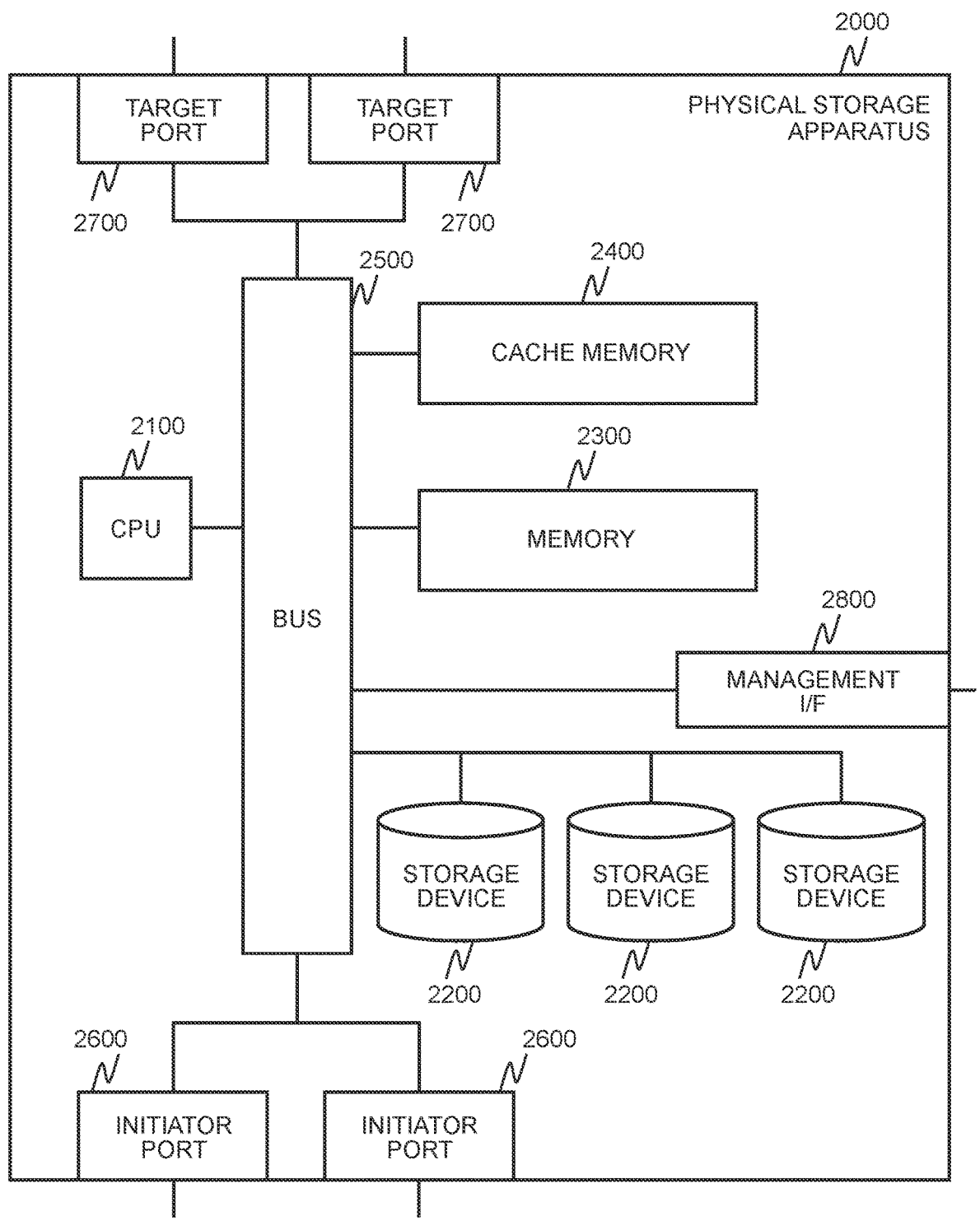
FIG. 4 is a diagram showing a hardware configuration example of a physical storage apparatus.

FIG. 4 is a schematic view of a configuration example of the physical storage apparatuses 2000. In this example, the basic configuration of all the physical storage apparatuses 2000 is the same but the number of constituent elements and the storage capacity and so forth depend on each of the physical storage apparatuses 2000. The physical storage apparatuses 2000 may also have different basic configurations.

The physical storage apparatuses 2000 comprise a plurality of storage devices (hard disk drives and/or SSD (Solid State Drives), for example) 2200, and a storage controller which controls the physical storage apparatuses 2000 and performs volume management and data communications and the like with the host computer 1000 or the other physical storage apparatuses 2000.

The storage controller comprises a CPU 2100 which is a processor, a memory 2300, an initiator port 2600 which is an interface on the I/O request issuing side, a target port 2700 which is an interface on the I/O request receiving side, a management interface (management I/F) 2800, and a cache memory 2400 for data transfers. The constituent elements of the storage apparatuses 2000 are communicably coupled by means of a bus 2500.

The physical storage apparatuses 2000 are coupled to external (other) physical storage apparatuses 2000 via the initiator port 2600 and are capable of sending I/O requests and write data to the external physical storage apparatuses 2000 and of receiving read data from the external physical storage apparatuses 2000. The initiator port 2600 is coupled to the SAN 5000.

The initiator port 2600 comprises a function for converting a protocol such as FC, Fibre Channel Over Ethernet (FCoE) and iSCSI which are used in communicating with the external physical storage apparatuses 2000 to a protocol which is used within the storage controller, such as PCIe, for example.

The physical storage apparatuses 2000 are coupled to the host computer 1000 or external physical storage apparatuses 2000 in the target port 2700. The physical storage apparatuses 2000 receive I/O requests and write data from the host computer 1000 and the external physical storage apparatuses 2000 via the target port 2700 and send read data to the host computer 1000 or external physical storage apparatuses 2000. The target port 2700 is coupled to the SAN 5000.

The target port 2700 comprises a function for converting a protocol such as FC, Fibre Channel Over Ethernet (FCoE) and iSCSI which are used in communicating with the host computer 1000 or external physical storage apparatuses 2000 to a protocol which is used within the storage controller, such as PCIe, for example.

The management interface 2800 is a device for coupling to the LAN 6000. The management interface 2800 comprises a function for converting the protocol used by the LAN 6000 to the protocol which is used within the storage controller, such as PCIe, for example.

The CPU 2100 executes a program for controlling the physical storage apparatuses 2000 and implements predetermined functions which include control of I/O to/from the host computer 1000 and management and control of the physical storage apparatuses 2000. At least a portion of the functions implemented by the CPU 2100 which are explained in this embodiment could also be implemented by means of a block circuit which is different from the CPU 2100.

As a result of being executed by the processor (CPU), the program performs determined processing while using the memory and interface unit. Therefore, the explanation in which the program is the subject in this disclosure may also be an explanation in which the processor is the subject. Alternatively, the processing executed by the program is processing which is executed by an apparatus (the physical storage apparatuses 2000 or host computer 1000, for example) and system on which the program runs.

The memory 2300 stores data and programs and the like which are handled by the CPU 2100. The data of the memory 2300 is loaded into the memory 2300 from a storage device which comprises a non-transient storage medium such as any of the storage devices 2200 in the physical storage apparatuses 2000, flash memory (not shown), or another apparatus which is coupled via the LAN 5000, for example.

Figure 5:
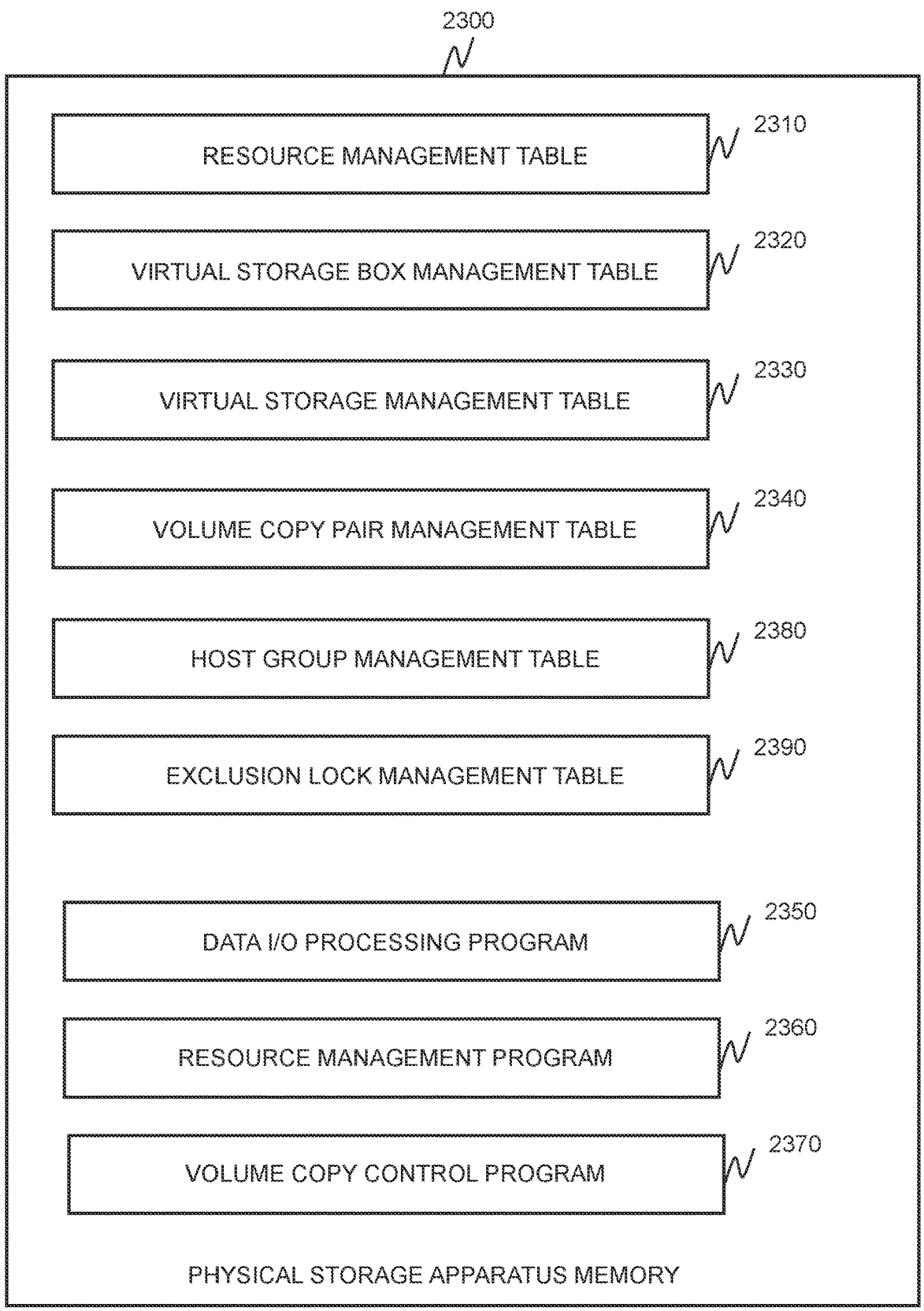
FIG. 5 is a diagram showing a software configuration example of a physical storage apparatus.

FIG. 5 shows a configuration example of software in each memory 2300 of the physical storage apparatuses 2000. The memory 2300 holds a data input/output processing program 2350, a resource management program 2360, and a volume copy control program 2370. In addition, the memory 2300 holds a resource management table 2310, a virtual storage box management table 2320, a virtual storage management table 2330, a volume copy pair management table 2340, a host group management table 2380, and an exclusion lock management table 2390.

The data input/output processing program 2350 performs reading and writing of user data according to I/O requests from the host computer 1000 and performs required data communications between the host computer 1000 and the other physical storage apparatuses 2000.

The resource management program 2360 manages the resources of the physical storage apparatuses 2000. The resource management program 2360 creates and updates tables (information) which will be explained hereinbelow in addition to creating and deleting volumes. The resource management program 2360 sends and receives information that is required for resource management to/from the management computer 4000.

The volume copy control program 2370 controls copying between the physical volumes in the HA pairs.

The tables (information) which are each held by the physical storage apparatuses 2000 and referenced in the explanation of this embodiment will be explained hereinbelow. Tables which have the same names have the same configuration (fields) in each physical storage apparatus 2000. The tables which are explained hereinbelow with reference to the drawings are tables which are held by the physical storage apparatus 1 (2000). Note that the information held by each apparatus could also be stored in a structure other than a table.

FIG. 6A shows a configuration example of the resource management table 2310. The resource management table 2310 is a table for managing the resources of the physical storage apparatus 1 (2000).

The resource management table 2310 comprises a resource type field 2311 which stores resource types of the physical storage apparatus 1 (2000), a resource ID field 2312 which stores resource IDs, a resource group ID field 2313 which stores the IDs of resource groups to which the resources belong, and a virtual resource ID field 2314 which stores virtual resource IDs which have been assigned to the resources.

FIG. 6B shows a configuration example of the host group management table 2380. The host group is obtained by grouping WWN (World Wide Names) of the host computers 1000 which are coupled to the port, for each OS type of the host computers 1000. The host group management table 2380 comprises a port ID field 2381 which stores port IDs, a host group ID field 2382 which stores host group IDs relating to the ports, a host mode field 2383 indicating the OS types of the host computers 1000, a host WWN field 2384 which stores the host WWN registered in the host groups, and a volume ID field 2385 which stores IDs of volumes accessible to host computers 1000 which belong to the host group ID 2382.

FIG. 7 shows a configuration example of the virtual storage box management table 2320. A virtual storage box is a set of resource groups which one virtual storage apparatus carries in one physical storage apparatus. The virtual storage box management table 2320 is a table for managing the virtual storage boxes of the virtual storage apparatus 3000.

The virtual storage box management table 2320 comprises a virtual storage box ID field 2321 which stores virtual storage box IDs, and a resource group ID field 2322 which stores the IDs of resource groups belonging to the virtual storage box.

FIG. 8 shows a configuration example of the virtual storage management table 2330. The virtual storage management table 2330 is a table for managing the virtual storage apparatuses 3000. The virtual storage management table 2330 comprises a virtual storage ID field 2331 which stores virtual storage IDs, and a virtual storage box ID field 2332 which stores the IDs of virtual storage boxes which belong to the storage apparatuses.

FIG. 9A shows a configuration example of the volume copy pair management table 2340. The volume copy pair management table 2340 is a table for managing volume copy pairs which include volumes provided by the physical storage apparatuses 2000.

The volume copy pair management table 2340 comprises a pair ID field 2341 which stores pair IDs of volume copy pairs, a pair type field 2342 which stores the pair types, and a pair state field 2343 which stores the states of the pairs.

The volume copy pair management table 2340 further comprises a PVOL ID field 2344 which stores PVOL IDs and an SVOL ID field 2345 which stores SVOL IDs. In this example, the PVOL IDs and SVOL IDs are configured from identification information of the physical storage apparatuses 2000 and identification information of the physical volumes of these physical storage apparatuses.

The volume copy pair management table 2340 further comprises a related pair ID field 2346 which stores the IDs of pairs related to the pairs, and a priority level field 2347 which stores the priority levels of the pairs and related pairs.

In this example, the smaller the numerical value of the priority level, the higher the priority level is.

The pair types stored in the pair type field 2342 denote the types of volume copy pairs, where HA is "HA," a volume local copy in physical storage is "LC," a volume remote copy between physical storage is "RC," and an HA multi-target configuration is "HA-MLT," and so forth.

The pair states stored in the pair state field 2343 store a character string or number or the like denoting the state of a data copy between a volume copy pair, where data copy in progress is "COPYING," a synchronized state after a data copy is complete is "PAIR," and a data copy suspension is "SUSPENDED" and so forth.

The priority levels stored in the priority level field 2347 denote information for determining the order for data writing in the HA multi-target configuration. Where the HA multi-target configuration is concerned, in this embodiment, the priority levels of the first pair and second pair are the same, and therefore writing to the PVOL of the first pair and second pair is performed first and writing to the SVOL of the first pair and the SVOL of the second pair is performed in parallel thereafter.

FIG. 9B shows a configuration example of the exclusion lock management table 2390. The exclusion lock management table 2390 holds information for managing physical volume exclusion locks. The exclusion lock management table 2390 comprises an exclusion lock ID field 2391 which stores exclusion lock IDs, a volume ID field 2392 which stores the IDs of physical volumes, and an LBA field 2393 which stores the LBA (Logical Block Addresses) where an exclusion lock is applied.

The exclusion lock management table 2390 manages exclusion-locked data storage areas. Each entry indicates an area in the volume which has been exclusion-locked and is designated by means of a start LBA and data length, for example, by using the volume ID and address (LBA) in the volume. Although partial areas in a volume are exclusion-locked in this example, exclusion locking could also be performed in volume units. Furthermore, a field for storing exclusion lock types could also be provided and the exclusion lock IDs could also contain information indicating the exclusion lock type. For example, an exclusion lock which corresponds to an exclusion lock ID that starts with a certain sign could be a non-writable and non-readable exclusion lock, and an exclusion lock which corresponds to an exclusion lock ID that starts with another sign could be a non-writable and readable exclusion lock.

Figure 10:
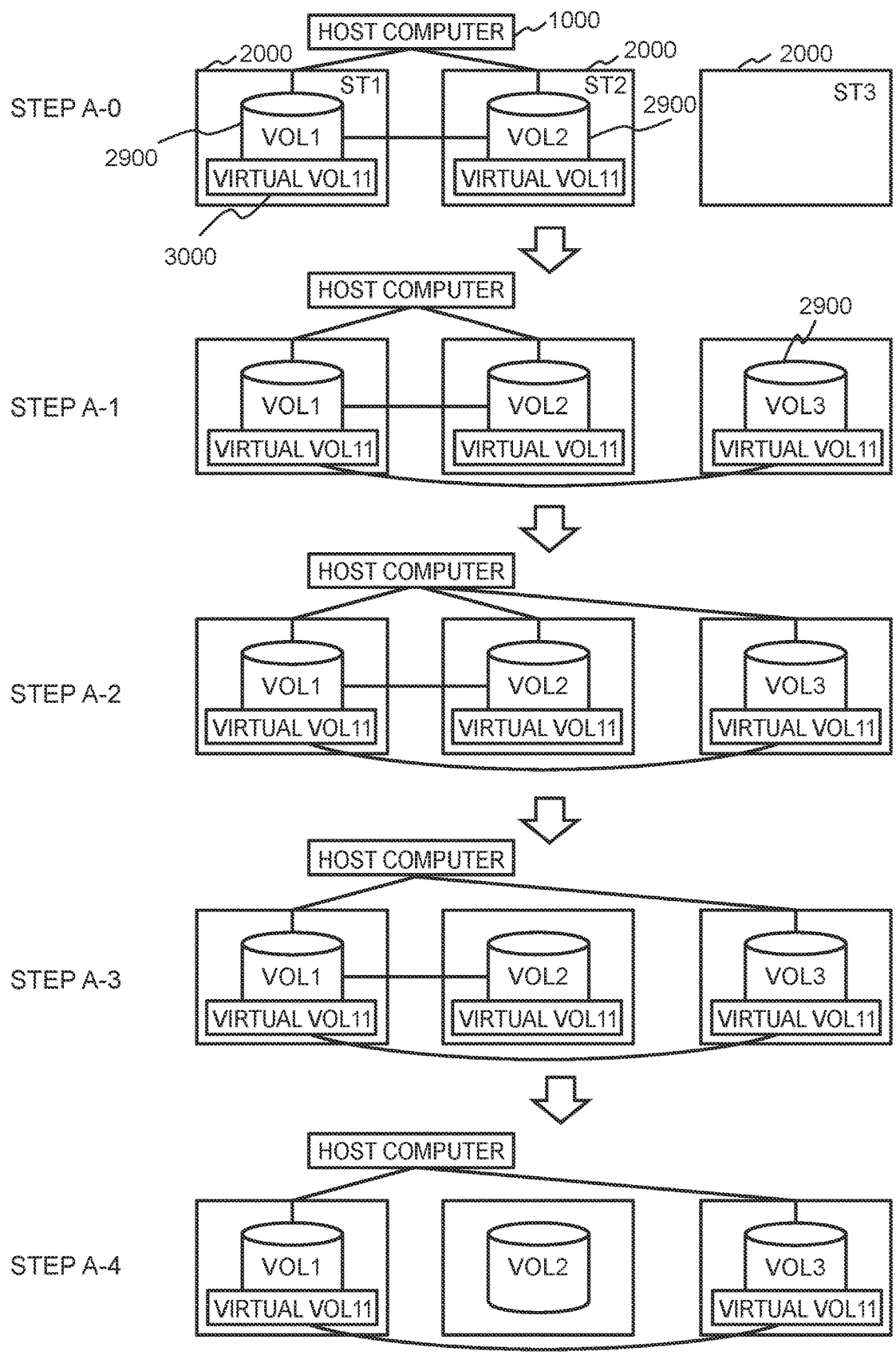
FIG. 10 is a diagram showing HA volume migration steps.

FIG. 10 shows steps for migrating the physical VOL2 (SVOL) 2900 of the physical storage apparatus 2 (ST2) (2000) to the physical VOL3 (SVOL) 2900 of the physical storage apparatus 3 (ST3) (2000). The physical VOL1, VOL2, VOL3 (2900) are constituent elements of the virtual VOL11 (3000). Note that some of the reference signs are omitted.

The physical VOL2 (SVOL) 2900 and the physical VOL1 (PVOL) 2900 of the physical storage apparatus 2 (2000) are a pre-migration volume pair (first volume pair).

The physical VOL3 (2900) and the physical VOL1 (PVOL) 2900 are a post-migration volume pair (second volume pair). In the migration, the data of the physical VOL1 (PVOL) 2900 is copied to the physical VOL3 (2900). In this example, the system administrator who is able to carry out both host management and storage management performs path and volume configuration.

In FIG. 10, step A-0 denotes an initial state. A path is defined between the host computer 1000 and the physical VOL1 and VOL2. The physical VOL1 and VOL2 form a volume pair. The physical VOL1 and VOL2 are constituent elements of the virtual VOL11 and the host computer 1000 is also able to access either of the physical VOL1 and VOL2 to access the virtual VOL11.

In step A-1, the physical storage apparatus 3 creates the physical VOL3 according to an instruction from the system administrator. The physical storage apparatus 1 (ST1) and physical storage apparatus 3 create the HA pair of the physical VOL1 and physical VOL3 according to an instruction from the system administrator. A virtual ID is assigned to the VOL3. At this time, the VOL1, VOL2, and VOL3 are an HA multi-target configuration.

In step A-2, the host computer 1000 and physical storage apparatus 3 define a path from the host computer 1000 to the physical VOL3 according to an instruction from the system administrator. The physical storage apparatus 3 adds information which is the WWN of the host, a port ID, and the volume ID of the VOL3 to the host group management table 2380.

Thereafter, in step A-3, the host computer 1000 and physical storage apparatus 2 delete the path from the host computer 1000 to the physical VOL2 according to an instruction from the system administrator. The physical storage apparatus 2 deletes the information which is the WWN of the host, port ID, and the volume ID of the VOL2 from the host group management table 2380.

Thereafter, in step A-4, the physical storage apparatuses 1 and 2 delete the HA pair of the physical VOL1 and physical VOL2 and the physical storage apparatus 2 deletes the virtual ID of the physical VOL2 according to an instruction from the system administrator.

The write processing and read processing of this example relating to an HA multi-target configuration will be explained. Note that, in order to simplify the explanation hereinbelow, it is assumed that the plurality of physical volumes which are based on the virtual VOL11 (an example of virtual volumes) are a PVOL (an example of the primary physical volume, for example, physical VOL1) and an SVOL1 (an example of a first secondary physical volume, for example, physical VOL2) which form an HA pair 1 (an example of the first volume group which is the migration source). It is assumed that an HA pair 2 (an example of a second volume group which is a migration destination) is an example of an HA pair which is newly created as a migration destination and is configured from the same PVOL and SVOL2 (an example of the second secondary physical volume, for example, physical VOL3). Furthermore, it is assumed that the physical storage apparatus (an example of the first storage apparatus) which comprises the SVOL1 is a storage apparatus 1, that the physical storage apparatus (an example of the second storage apparatus) which comprises the SVOL2 is a storage apparatus 2, and that the physical storage apparatus (an example of the third storage apparatus) which comprises the PVOL is a storage apparatus 3.

In this embodiment, during migration from the HA pair 1 to HA pair 2, even when the storage system receives a WRITE command as an I/O command and the received WRITE command designates any of the PVOL, SVOL1, and SVOL2, at least one of the storage apparatuses 1 to 3 writes data of a write target according to the WRITE command to the PVOL and then writes the write target data in parallel to the SVOL1 and SVOL2. Furthermore, in this embodiment, during migration from the HA pair 1 to HA pair 2, even when the storage system receives a READ command as an I/O command and the received READ command designates any of the PVOL, SVOL1, and SVOL2, at least one of the storage apparatuses 1 to 3 reads data of a read target according to the READ command from the PVOL, in other words, does not perform reading from the SVOL1 and SVOL2. Thus, the write target data is first stored in the PVOL and then stored in the SVOL1 and SVOL2. The read target data must be read from the PVOL. That is, ordering and consistency are guaranteed. As a result, even if writing is performed in parallel to the SVOL1 and SVOL2, where reading is concerned, it is possible to prevent so-called data corruption from occurring.

More specifically, in this embodiment, even when any of the storage apparatuses 1 to 3 receives a WRITE command or READ command, at least one of the data input/output processing program 2350 and volume copy control program 2370 (hereinafter called 'program units' for the sake of convenience), which are executed by the storage apparatus which has received this command, performs (w) and (r) described below.

(w) Even if the received command is a WRITE command and the WRITE command designates any of the PVOL, SVOL1 and SVOL2, write target data according to the WRITE command is written to the PVOL and then the write target data is written to at least one of the SVOL1 and SVOL2.

(r) Even if the received command is a READ command and the READ command designates any of the PVOL, SVOL1 and SVOL2, read target data according to the READ command is read from the PVOL.

The details of (w) are as follows.

When a WRITE command is received by the storage apparatus 3, the program unit writes the write target data to the PVOL and then sends a WRITE command designating the SVOL1 to the storage apparatus 1 to write the write target data to the SVOL1 and sends a WRITE command designating the SVOL2 to the storage apparatus 2 to write the write target data to the SVOL2, in parallel. When a completion response has been received from each of the storage apparatuses 1 and 2, the program unit sends back a completion response to the host computer 1000.

When a WRITE COMMAND has been received by the storage apparatus 1, the program unit sends a WRITE command designating the PVOL to the storage apparatus 3 to write the write target data according to the WRITE command to the PVOL, without writing the write target data to the SVOL1. The storage apparatus 3 writes the write target data to the PVOL and then writes the write target data to the SVOL2 and sends back a completion response to the storage apparatus 1. In the storage apparatus 1, the program unit writes the foregoing write target data to the SVOL1 and sends back a completion response to the host computer 1000.

When a WRITE COMMAND has been received by the storage apparatus 2, the program unit sends a WRITE command designating the PVOL to the storage apparatus 3 to write the write target data according to the WRITE command to the PVOL, without writing the write target data to the SVOL2. The storage apparatus 3 writes the write target data to the PVOL and then writes the write target data to the SVOL1 and sends back a completion response to the storage apparatus 2. In the storage apparatus 2, the program unit writes the foregoing write target data to the SVOL2 and sends back a completion response to the host computer 1000.

Write processing and read processing relating to an HA multi-target configuration will each be explained in detail hereinbelow. Note that predetermined processing is performed based on the tables shown in FIGS. 6A to 8 for WRITE commands and READ commands which are issued to the storage system (virtual storage apparatus 3000) and WRITE commands and READ commands designating any of the PVOL, SVOL1 and SVOL2 are received, however, in the ensuing explanation, an explanation of processing which references the tables shown in FIGS. 6A to 8 is omitted.

Figure 11:
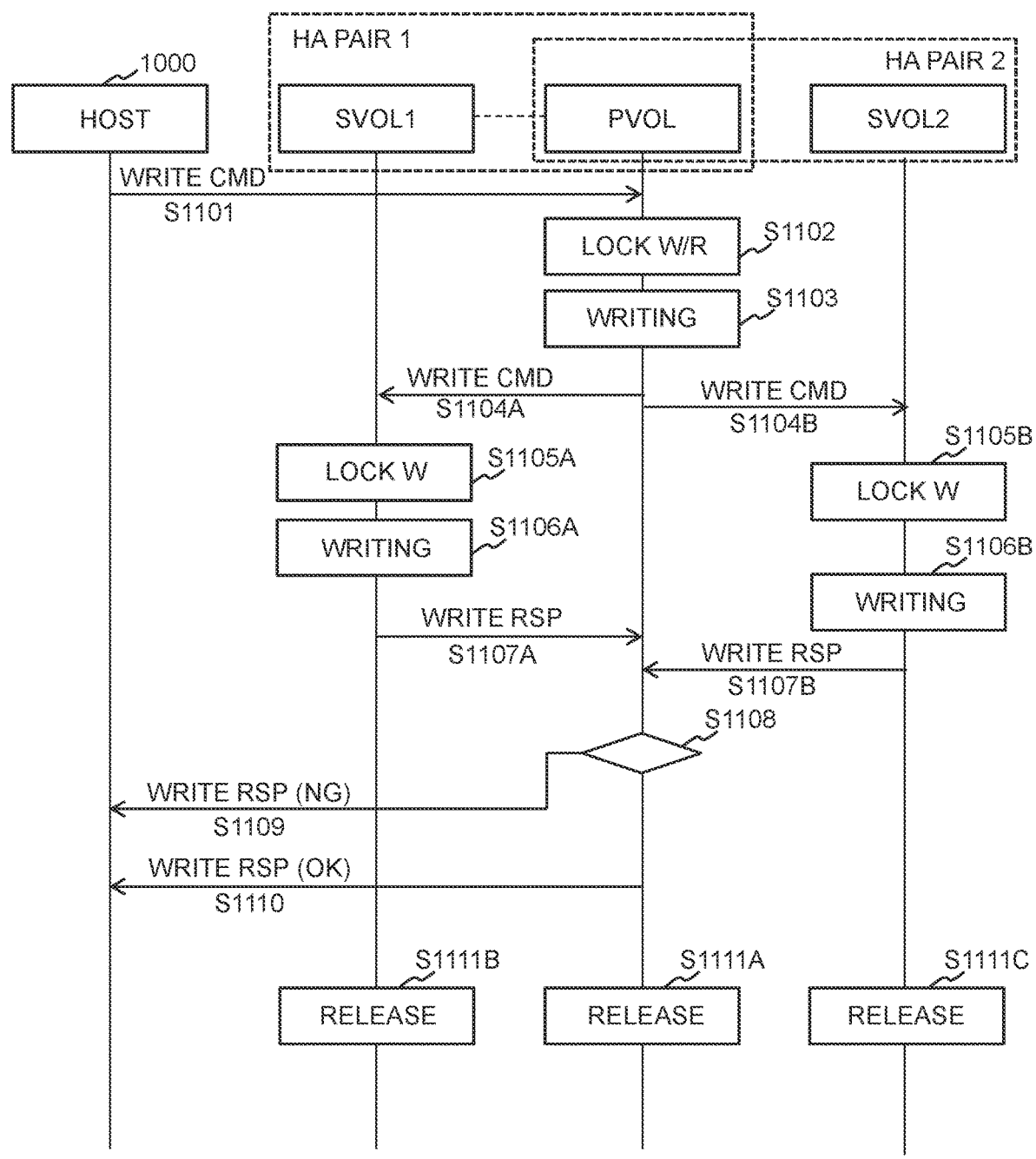
FIG. 11 is a diagram showing the flow of write processing in a case where a PVOL is designated by a WRITE command from a host computer.

First, write processing relating to an HA multi-target configuration will be explained in detail. Note that the following notation rules are adopted in FIGS. 11 to 13:

'WRITE CMD'=WRITE command
'WRITE RSP'=completion response or error response to WRITE command
'WRITE RSP (OK)'=completion response to WRITE command
'WRITE RSP (NG)'=error response to WRITE command
'LOCK W/R'=non-writable and non-readable exclusion lock
'LOCK W'=non-writable and readable exclusion lock FIG. 11 is a diagram showing the flow of write processing in a case where the PVOL is designated by a WRITE command from the host computer 1000 (a case where the path 8100 of FIG. 1 is used to send the WRITE command).

The data input/output processing program 2350 of the storage apparatus 3 receives the WRITE command from the host computer 1000 (S1101).

The data input/output processing program 2350 or volume copy control program 2370 of the storage apparatus 3 applies a non-writable and non-readable exclusion lock to the PVOL and, more specifically, adds an entry which includes the exclusion lock ID, the PVOL ID, and the LBA to which the exclusion lock has been applied to the exclusion lock management table 2390, for example (S1102). The data input/output processing program 2350 of the storage apparatus 3 writes the write target data to the PVOL (S1104). Note that, here, the write target data may actually be written to the PVOL and may be written to the cache memory 2400 of the storage apparatus 3 and subsequently written asynchronously to the PVOL. Data cannot be written to or read from the area to which the non-writable and non-readable exclusion lock has been applied.

The volume copy control program 2370 of the storage apparatus 3 sends a WRITE command designating the SVOL1 to the storage apparatus 1 (S1104A) and sends a WRITE command designating the SVOL2 to the storage apparatus 2 (S1104B), in parallel. The partners of the PVOL, namely, the SVOL1 and SVOL2 are specified from the volume copy pair management table 2340. Furthermore, because the priority levels of the HA pair 1 and HA pair 2 are the same, S1104A and S1104B are performed in parallel.

The data input/output processing program 2350 or volume copy control program 2370 of the storage apparatus 1 applies a non-writable and readable exclusion lock on the SVOL1 in response to the WRITE command from the storage apparatus 3 (S1105A). The data input/output processing program 2350 or volume copy control program 2370 of the storage apparatus 1 writes the write target data to the SVOL1 (S1106A) and then sends back a response to the WRITE command from the storage apparatus 3 (S1107A). Note that processing as per S1105A to S1107A is performed for the SVOL2 by means of the data input/output processing program 2350 or volume copy control program 2370 of the storage apparatus 2 (S1105B to S1107B).

The volume copy control program 2370 of the storage apparatus 3 determines whether or not a completion response has been received from both the storage apparatuses 1 and 2 (S1108). When the determination result of S1108 is false, the data input/output processing program 2350 of the storage apparatus 3 sends back an error response to the host computer 1000 (S1109). The error response may, for example, be a response prompting a retry (a check response, for example). As a result, the host computer 1000 is able to resend the same WRITE command.

When the determination result of S1108 is true, the data input/output processing program 2350 of the storage apparatus 3 sends back a completion response to the host computer 1000 (S1110).

The exclusion lock is cancelled for each of the storage apparatuses 1 to 3 (S1111A, S1111B, S1111C). For example, after S1110, the data input/output processing program 2350 or volume copy control program 2370 of the storage apparatus 3 reports having sent back a completion response to the host computer 1000 to each of the storage apparatuses 1 and 2 and cancels the non-writable and non-readable exclusion lock for the PVOL and, more specifically, deletes the entry containing the exclusion lock ID, the PVOL ID, and the LBA to which the exclusion lock has been applied from the exclusion lock management table 2390, for example (S1111A). The data input/output processing program 2350 or volume copy control program 2370 of the storage apparatus 1 receives the report from the storage apparatus 3 and cancels the non-writable and readable exclusion lock on the SVOL1 (S1111B). Similarly, the data input/output processing program 2350 or volume copy control program 2370 of the storage apparatus 2 receives the report from the storage apparatus 3 and cancels the non-writable and readable exclusion lock on the SVOL2 (S1111C).

According to FIG. 11, even when data is written in parallel to the SVOL1 and SVOL2, the order for writing data beforehand to the PVOL is maintained and, in the read processing, even when any of the PVOL, SVOL1 and SVOL2 is designated by the READ command, because the data read source is restricted to the PVOL, consistency is also maintained. Furthermore, the non-writable and non-readable exclusion lock for the PVOL and the non-writable and readable exclusion lock for each of the SVOL1 and SVOL2 contribute toward the maintenance of consistency.

Figure 12:
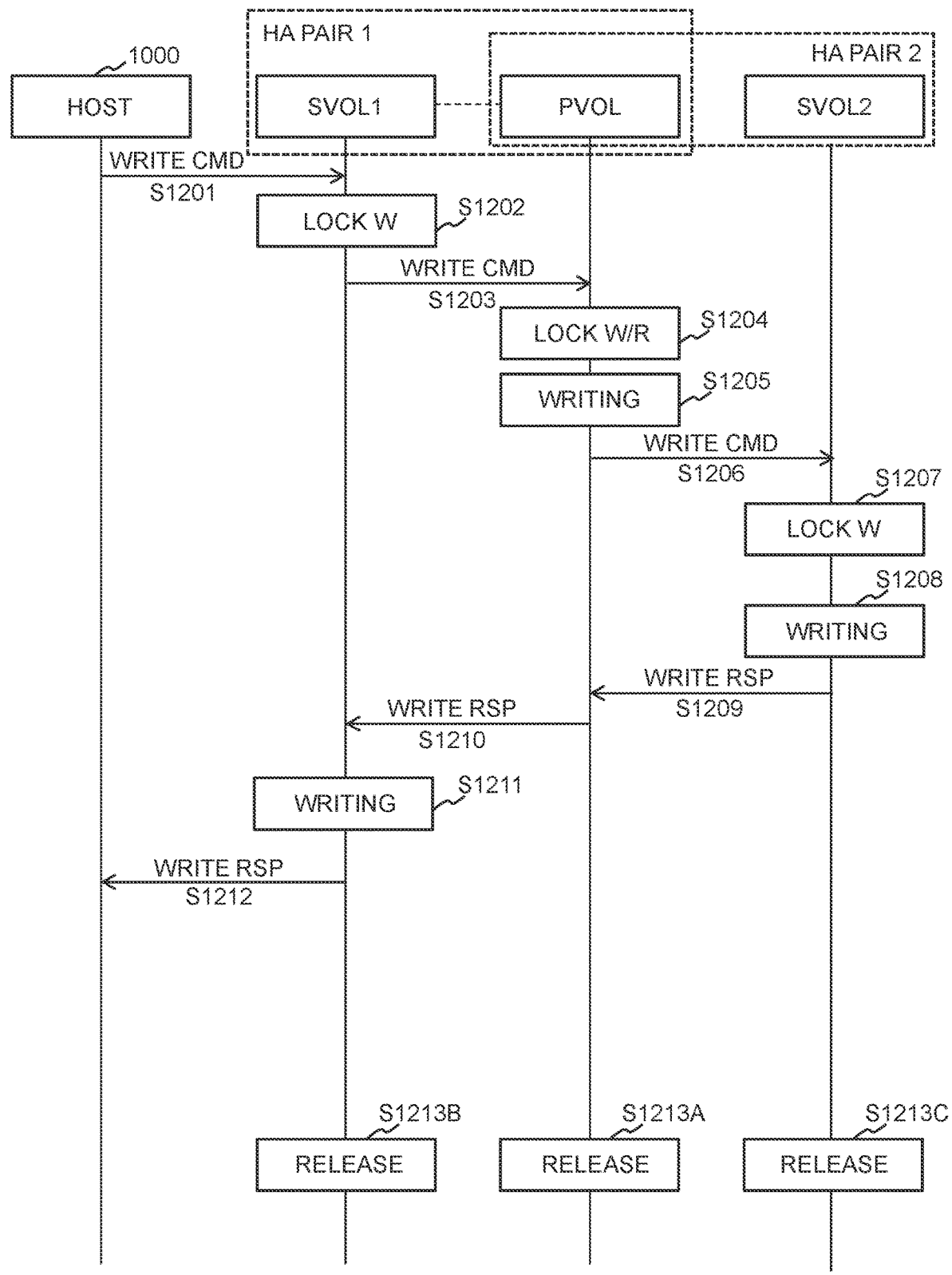
FIG. 12 is a diagram showing the flow of write processing in a case where an SVOL1 is designated by a WRITE command from a host computer.

FIG. 12 is a diagram showing the flow of write processing in a case where the SVOL1 is designated by a WRITE command from the host computer 1000 (a case where the path 8200 of FIG. 1 is used to send the WRITE command).

The data input/output processing program 2350 of the storage apparatus 1 receives the WRITE command from the host computer 1000 (S1201).

The data input/output processing program 2350 or volume copy control program 2370 of the storage apparatus 1 applies a non-writable and readable exclusion lock for the SVOL1 (S1202). Furthermore, the volume copy control program 2370 of the storage apparatus 1 sends a WRITE command designating the PVOL to the storage apparatus 3 (S1203). The partner of the SVOL1, namely, the PVOL is specified from the volume copy pair management table 2340.

The data input/output processing program 2350 or volume copy control program 2370 of the storage apparatus 3 applies a non-writable and non-readable exclusion lock for the SVOL1 in response to the WRITE command from the storage apparatus 1 (S1204) and writes the write target data to the PVOL (S1205). Furthermore, the volume copy control program 2370 of the storage apparatus 3 sends a WRITE command designating the SVOL2 to the storage apparatus 2 (S1206). The partner of the PVOL, namely, the SVOL2 is specified from the volume copy pair management table 2340 and the WRITE command is received from the SVOL1, and therefore it is specified that there is no need to send the WRITE command to the SVOL1.

The data input/output processing program 2350 or volume copy control program 2370 of the storage apparatus 2 applies a non-writable and readable exclusion lock for the SVOL2 in response to the WRITE command from the storage apparatus 3 (S1207) and writes the write target data to the SVOL2 (S1208). Furthermore, the volume copy control program 2370 of the storage apparatus 2 sends back a response to the WRITE command from the storage apparatus 3 (S1209).

Upon receiving the response from the storage apparatus 2, the volume copy control program 2370 of the storage apparatus 3 sends back a response to the WRITE command from the storage apparatus 1 (S1210).

Upon receiving the response from the storage apparatus 3, the data input/output processing program 2350 or volume copy control program 2370 of the storage apparatus 1 writes the write target data to the SVOL1 (S1211) and sends back a response to the WRITE command received in S1201 to the host computer 1000 (S1212).

The exclusion lock is cancelled for each of the storage apparatuses 1 to 3 (S1213A, S1213B, S1213C). For example, after S1212, the data input/output processing program 2350 or volume copy control program 2370 of the storage apparatus 1 reports having sent back a completion response to the host computer 1000 to the storage apparatus 3 and this report is also sent from the storage apparatus 3 to the storage apparatus 2. Lock cancellation as per S1213A to S1213C is subsequently performed.

According to FIG. 12, even when the SVOL1 is designated as the write destination by the WRITE command from the host computer 1000, data is written to the PVOL before data is written to the SVOL1. In other words, the order for writing data to the PVOL beforehand is maintained. In read processing, even when any of the PVOL, SVOL1 and SVOL2 is designated by the READ command, the data read source is restricted to the PVOL. Consistency is therefore also maintained.

Note that, according to the example in FIG. 12, data is written in the order PVOL→SVOL2→SVOL1 but when a WRITE command has been sent to the PVOL, data is written in parallel to the SVOL2 and SVOL1. That is, after S1205, a WRITE command designating the SVOL1 may be sent from the storage apparatus 3 to the storage apparatus 1 in parallel to S1206. Further, upon receiving a completion response from each of the storage apparatuses 1 and 2, the storage apparatus 3 may report completion to the storage apparatus 1. Upon receiving this report, the storage apparatus 1 may send back a completion response to the host computer 1000.

Figure 13:
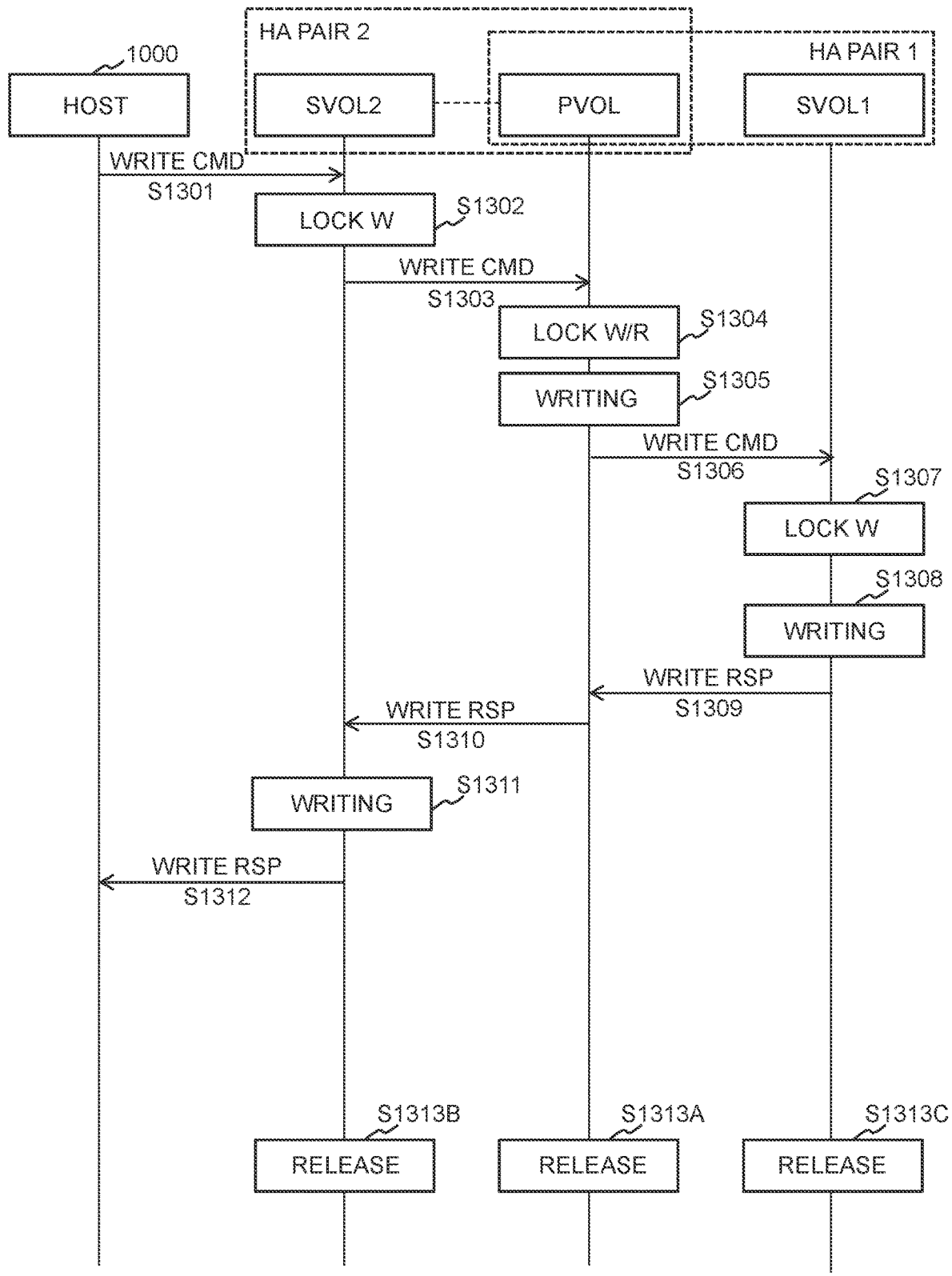
FIG. 13 is a diagram showing the flow of write processing in a case where an SVOL2 is designated by a WRITE command from a host computer.

FIG. 13 is a diagram showing the flow of write processing in a case where the SVOL2 is designated by a WRITE command from the host computer 1000 (a case where the path 8300 of FIG. 1 is used to send the WRITE command).

According to FIG. 13, processing as per S1201 to S1213C is performed respectively except for the fact that the SVOL1 in FIG. 12 is SVOL2 and the SVOL2 in FIG. 12 is SVOL1 (S1301 to S1313C).

Figure 14:
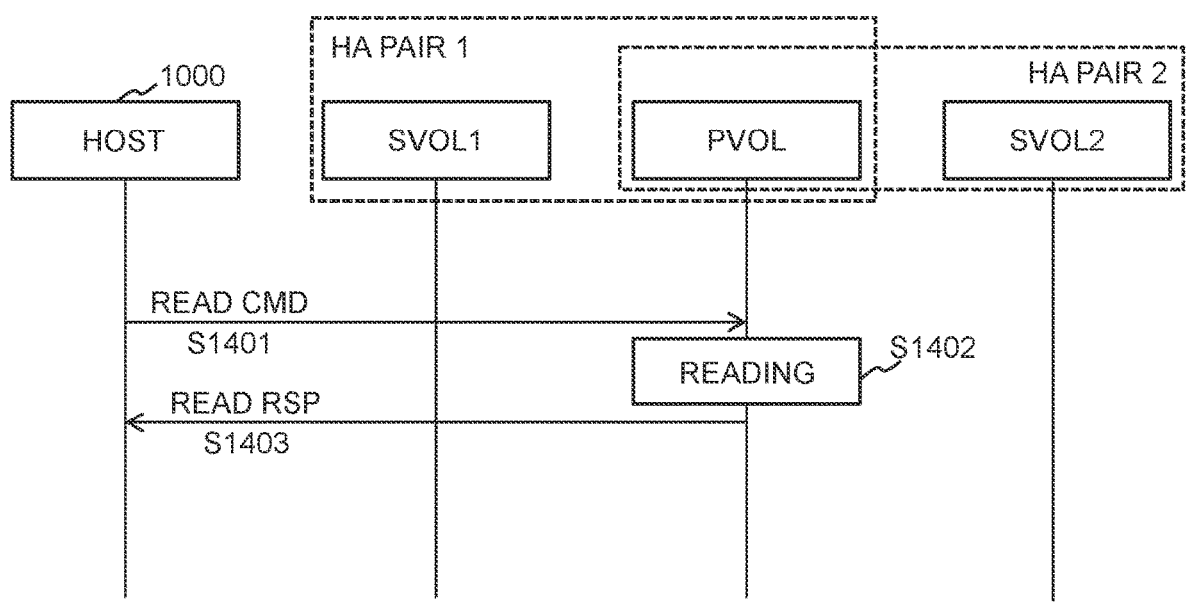
FIG. 14 is a diagram showing the flow of read processing in a case where the PVOL is designated by a READ command from a host computer.

Write processing relating to an HA multi-target configuration has been explained in detail hereinabove. Next, read processing relating to an HA multi-target configuration will be explained in detail. Note that the following notation rules are adopted in FIGS. 14 to 16:

'READ CMD'=READ command
'READ RSP'=completion response (response including read target data) or error response to READ command
'READ RSP (OK)'=completion response to READ command
'READ RSP (NG)'=error response to READ command
'LOCK W/R'=non-writable and non-readable exclusion lock
'LOCK W'=non-writable and readable exclusion lock FIG. 14 is a diagram showing the flow of read processing in a case where the PVOL is designated by a READ command from the host computer 1000 (a case where the path 8100 of FIG. 1 is used to send the READ command).

The data input/output processing program 2350 of the storage apparatus 3 receives the READ command from the host computer 1000 (S1401).

The data input/output processing program 2350 of the storage apparatus 3 reads the read target data according to the READ command from the PVOL (S1402).

The data input/output processing program 2350 of the storage apparatus 3 sends back a response including the read target data to the host computer 1000 (S1403).

Figure 15:
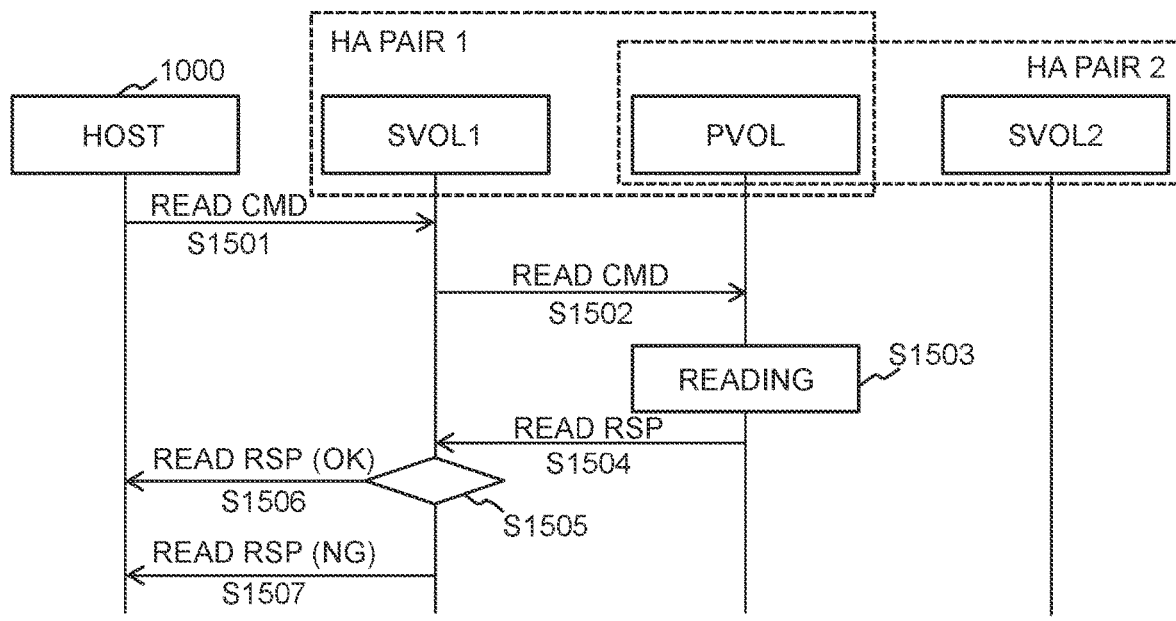
FIG. 15 is a diagram showing the flow of read processing in a case where the SVOL1 is designated by a READ command from a host computer.

FIG. 15 is a diagram showing the flow of read processing in a case where the SVOL1 is designated by a READ command from the host computer 1000 (a case where the path 8200 of FIG. 1 is used to send the READ command).

The data input/output processing program 2350 of the storage apparatus 1 receives the READ command from the host computer 1000 (S1501).

The data input/output processing program 2350 or volume copy control program 2370 of the storage apparatus 1 sends a READ command designating the PVOL to the storage apparatus 3 without reading the read target data from the SVOL1 (S1502).

The data input/output processing program 2350 or volume copy control program 2370 of the storage apparatus 3 reads the read target data from the PVOL in response to the READ command from the storage apparatus 1 (S1503) and sends back a response including the read target data (S1504).

The data input/output processing program 2350 of the storage apparatus 1 determines whether or not reading according to the READ command sent in S1502 has succeeded (whether or not a response including the read target data has been received) (S1505).

When the determination result of S1505 is true, the data input/output processing program 2350 of the storage apparatus 1 sends back a response including the read target data as a response to the READ command received in S1501 (S1506).

When the determination result of S1505 is false, the data input/output processing program 2350 of the storage apparatus 1 sends back an error response to the host computer 1000 (S1507). The error response may, for example, be a response prompting a retry (a check response, for example). As a result, the host computer 1000 is able to resend the same READ command.

According to FIG. 15, even when the SVOL1 is designated as the read source by the READ command from the host computer 1000, data is read from the PVOL to which data was first written. Consistency is therefore maintained.

Figure 16:
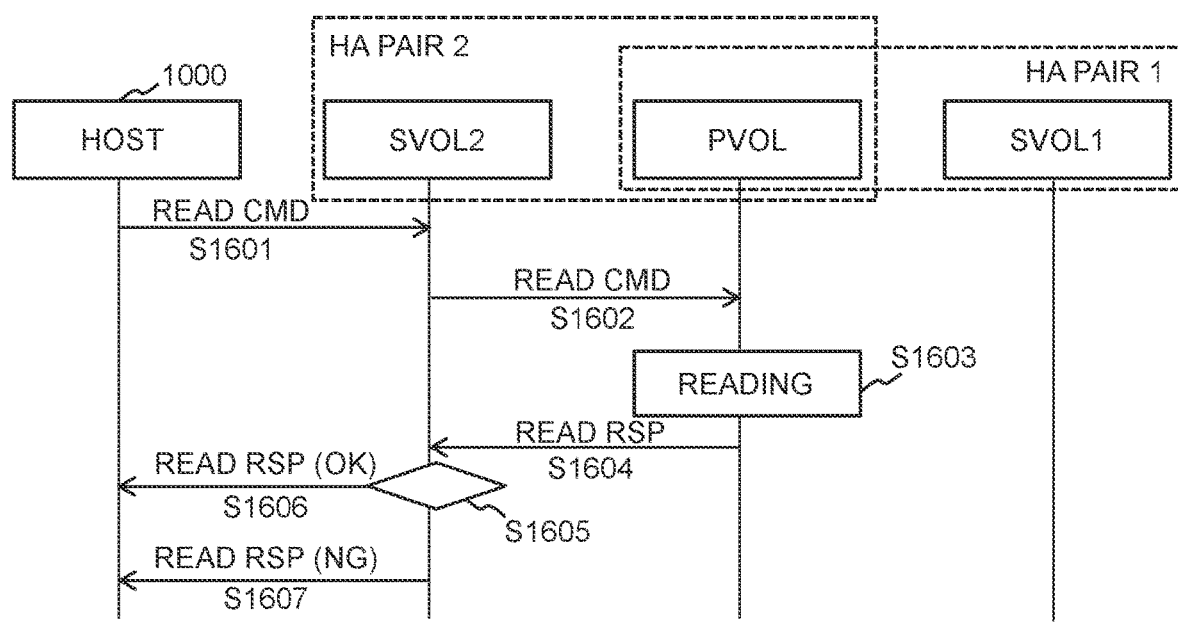
FIG. 16 is a diagram showing the flow of read processing in a case where the SVOL2 is designated by a READ command from a host computer.

FIG. 16 is a diagram showing the flow of read processing in a case where the SVOL2 is designated by a READ command from the host computer 1000 (a case where the path 8300 of FIG. 1 is used to send the READ command).

According to FIG. 16, processing as per S1501 to S1507 is performed respectively except for the fact that the SVOL1 in FIG. 15 is SVOL2 and the SVOL2 in FIG. 15 is SVOL1 (S1601 to S1607).

Note that the present invention is not limited to or by the foregoing embodiments and encompasses a variety of modification examples. For example, the foregoing embodiment has been explained in detail in order to provide an explanation that facilitates understanding of the present invention, but the present invention is not necessarily limited to an embodiment that comprises all the configurations thus explained. Furthermore, a portion of the configuration of a certain embodiment can be replaced by the configuration of another embodiment, and the configuration of another embodiment can be added to the configuration of a certain embodiment. Moreover, a portion of the configuration of each embodiment can have other configurations added thereto or can be removed or replaced.

Moreover, each of the foregoing configuration/function/ processing units and so forth may also be realized by means of hardware by designing a portion or all of the foregoing configurations and so forth by means of an integrated circuit, for example. Furthermore, each of the foregoing configurations and functions and so forth may also be realized by software as a result of a processor interpreting and executing a program which realizes the respective functions. The information of the programs, tables, files and the like representing each of the functions can be placed on recording apparatuses such as memory, hard disks and SSD (Solid State Drives), or on recording media such as IC cards and SD cards.

What is claimed is:

1. A storage system, comprising:
a plurality of storage apparatuses which migrate a first volume group based on a virtual volume to a second volume group,
wherein the first volume group includes a primary physical volume and a first secondary physical volume, the primary physical volume and the first secondary physical volume can both be designated by an I/O (Input/ Output) command and data is synchronized between the primary physical volume and the first secondary physical volume in the first volume group,
wherein the second volume group includes the primary physical volume and a second secondary physical volume, the primary physical volume and the second secondary physical volume can both be designated by an I/O command and data is synchronized between the primary physical volume and the second secondary physical volume in the second volume group,
wherein the plurality of storage apparatuses comprise a first storage apparatus having the first secondary physical volume, a second storage apparatus having the second secondary physical volume, and a third storage apparatus having the primary physical volume,
wherein, when a write command designates any of the primary physical volume, the first secondary physical volume and the second secondary physical volume, at least one of the first storage apparatus, the second storage apparatus and the third storage apparatus writes data of a write target according to the write command to the primary physical volume and then writes the write target data to the first secondary physical volume and the second secondary physical volume,
wherein, when a read command designates any of the primary physical volume, the first secondary physical volume and the second secondary physical volume, at least one of the first storage apparatus, the second storage apparatus and the third storage apparatus reads data of a read target according to the read command from the primary physical volume,
wherein, when a first write command designates the primary physical volume:
the third storage apparatus writes the write target data to the primary physical volume in response to the first write command and then sends a second write command designating the first secondary physical volume to the first storage apparatus to write the write target data to the first secondary physical volume and sends a third write command designating the second secondary physical volume to the second storage apparatus to write the write target data to the second secondary physical volume, in parallel,
the first storage apparatus writes the write target data to the first secondary physical volume in response to the second write command from the third storage apparatus and sends back a first completion response to the third storage apparatus, the second storage apparatus writes the write target data to the second secondary physical volume in response to the third write command from the third storage apparatus and sends back a second completion response to the third storage apparatus, and
the third storage apparatus sends back a completion response to the received first write command when the first completion response from the first storage apparatus and second completion response from the second storage apparatus have been received.

2. The storage system according to claim 1,
wherein, when a fourth write command designates the first secondary physical volume:
the first storage apparatus sends a fifth write command designating the primary physical volume to the third storage apparatus to write the write target data according to the fifth write command to the primary physical volume, without writing the write target data to the first secondary physical volume,
the third storage apparatus writes the write target data to the primary physical volume in response to the fifth write command and then sends a sixth write command designating the second secondary physical volume to the second storage apparatus to write the write target data to the second secondary physical volume,
the second storage apparatus writes the write target data to the second secondary physical volume in response to the sixth write command from the third storage apparatus and sends back a third completion response to the third storage apparatus,
when the third completion response has been received, the third storage apparatus sends back a fourth completion response to the fifth write command from the first storage apparatus to the first storage apparatus, and
when the fourth completion response has been received, the first storage apparatus writes the write target data to the first secondary physical volume and sends back a fifth completion response to the received write command.

3. The storage system according to claim 1,
wherein, when the write command is received and designates any of the primary physical volume, the first secondary physical volume and the second secondary physical volume:
the third storage apparatus applies a non-writable and non-readable exclusion lock for the primary physical volume, writes the write target data to the primary physical volume, and cancels the non-writable and non-readable exclusion lock,
the first storage apparatus applies a first non-writable and readable exclusion lock for the first secondary physical volume, writes the write target data to the first secondary physical volume, and cancels the first non-writable and readable exclusion lock, and the second storage apparatus applies a second non-writable and readable exclusion lock for the second secondary physical volume, writes the write target data to the second secondary physical volume, and cancels the second non-writable and readable exclusion lock.

4. The storage system according to claim 1,
wherein, when a first read command is received and designates the first secondary physical volume:
the first storage apparatus sends a second read command designating the primary physical volume to the third storage apparatus to read the read target data according to the second read command from the primary physical volume, without reading the read target data from the first secondary physical volume,
the third storage apparatus reads the read target data from the primary physical volume in response to the second read command and sends back the read target data to the first storage apparatus, and
the first storage apparatus sends back the read target data from the third storage apparatus as a first response to the received first read command, and
wherein, when a third read command is received and designates the second secondary physical volume:
the second storage apparatus sends a fourth read command designating the primary physical volume to the third storage apparatus to read the read target data according to the fourth read command from the primary physical volume, without reading the read target data from the second secondary physical volume,
the third storage apparatus reads the read target data from the primary physical volume in response to the fourth read command and sends back the read target data to the second storage apparatus, and
the second storage apparatus sends back the read target data from the third storage apparatus as a second response to the received third read command.

5. The storage system according to claim 4,
wherein, when unable to receive the read target data from the third storage apparatus, the first storage apparatus sends back a first error message as the first response to the received first read command without performing reading from the first secondary physical volume in response to the received first read command, and
wherein, when unable to receive the read target data from the third storage apparatus, the second storage apparatus sends back a second error message as the second response to the received third read command without performing reading from the second secondary physical volume in response to the received third read command.

6. The storage system according to claim 1,
wherein, when a fourth write command is received and designates the second secondary physical volume:
the second storage apparatus sends a fifth write command designating the primary physical volume to the third storage apparatus to write the write target data according to the fifth write command to the primary physical volume, without writing the write target data to the second secondary physical volume,
the third storage apparatus writes the write target data to the primary physical volume in response to the fifth write command and then sends a sixth write command designating the first secondary physical volume to the first storage apparatus to write the write target data to the first secondary physical volume,
the first storage apparatus writes the write target data to the first secondary physical volume in response to the sixth write command from the third storage apparatus and sends back a third completion response to the third storage apparatus,
when the third completion response has been received, the third storage apparatus sends back a fourth completion response to the write command from the second storage apparatus to the second storage apparatus, and
when the fourth completion response has been received, the second storage apparatus writes the write target data to the second secondary physical volume and sends back a fifth completion response to the received fourth write command.

7. A storage control method performed by a storage system comprising a plurality of storage apparatuses which migrate a first volume group based on a virtual volume to a second volume group,
the first volume group includes a primary physical volume and a first secondary physical volume, the primary physical volume and the first secondary physical volume can both be designated by an I/O (Input/Output) command and data is synchronized between the primary physical volume and the first secondary physical volume in the first volume group,
the second volume group includes the primary physical volume and a second secondary physical volume, the primary physical volume and the second secondary physical volume in the first volume group can both be designated by an I/O command and data is synchronized between the primary physical volume and the second secondary physical volume in the first volume group in the second volume group, and
the plurality of storage apparatuses comprising a first storage apparatus having the first secondary physical volume, a second storage apparatus having the second secondary physical volume, and a third storage apparatus having the primary physical volume,
the storage control method comprising:
writing data of a write target according to a write command to the primary physical volume and then writing the write target data to the first secondary physical volume and the second secondary physical volume, when the write command designates any of the primary physical volume, the first secondary physical volume and the second secondary physical volume; and
reading data of a read target according to a read command from the primary physical volume when the read command designates any of the primary physical volume, the first secondary physical volume and the second secondary physical volume,
wherein, when the write command is received and designates any of the primary physical volume, the first secondary physical volume and the second secondary physical volume:
the third storage apparatus applies a non-writable and non-readable exclusion lock for the primary physical volume, writes the write target data to the primary physical volume, and cancels the non-writable and non-readable exclusion lock,
the first storage apparatus applies a first non-writable and readable exclusion lock for the first secondary physical volume, writes the write target data to the first secondary physical volume, and cancels the first non-writable and readable exclusion lock, and
the second storage apparatus applies a second non-writable and readable exclusion lock for the second secondary physical volume, writes the write target data to the second secondary physical volume, and cancels the second non-writable and readable exclusion lock.

8. A non-transitory computer readable storage medium in a storage system comprising a plurality of storage apparatuses which migrate a first volume group based on a virtual volume to a second volume group, the first volume group includes a primary physical volume and a first secondary physical volume, the primary physical volume and the first secondary physical volume can both be designated by an I/O (Input/Output) command and data is synchronized between the primary physical volume and the first secondary physical volume in the first volume group, the second volume group includes the primary physical volume and a second secondary physical volume, the primary physical volume and the second secondary physical volume in the second volume group can both be designated by an I/O command and data is synchronized between the primary physical volume and the second secondary physical volume in the second volume group, and the plurality of storage apparatuses comprising a first storage apparatus having the first secondary physical volume, a second storage apparatus having the second secondary physical volume, and a third storage apparatus having the primary physical volume, the non-transitory computer readable storage medium storing thereon a computer program which includes instructions executable by at least one processor to perform the steps of:

writing data of a write target according to a write command to the primary physical volume and then writing the write target data to at least one of the first secondary physical volume and the second secondary physical volume, even when the write command designates any of the primary physical volume, the first secondary physical volume and the second secondary physical volume, reading data of a read target according to a read command from the primary physical volume when the read command designates any of the primary physical volume, the first secondary physical volume and the second secondary physical volume, wherein, when a first read command is received and designates the first secondary physical volume:

sending, by the first storage apparatus, a second read command designating the primary physical volume to the third storage apparatus to read the read target data according to the second read command from the primary physical volume, without reading the read target data from the first secondary physical volume, reading, by the third storage apparatus, the read target data from the primary physical volume in response to the second read command and sends back the read target data to the first storage apparatus, and sending back, by the first storage apparatus, the read target data from the third storage apparatus as a first response to the received first read command, and wherein, when a third read command is received and designates the second secondary physical volume:

sending, by the second storage apparatus, a fourth read command designating the primary physical volume to the third storage apparatus to read the read target data according to the fourth read command from the primary physical volume, without reading the read target data from the second secondary physical volume, reading, by the third storage apparatus, the read target data from the primary physical volume in response to the fourth read command and sending back the read target data to the second storage apparatus, and sending back, by the second storage apparatus, the read target data from the third storage apparatus as a second response to the received third read command.

9. The non-transitory computer readable storage medium according to claim 8, wherein the computer program further includes instructions executable by the at least one processor to further perform the steps of:

when unable to receive the read target data from the third storage apparatus, sending back, by the first storage apparatus, a first error message as the first response to the received first read command without performing reading from the first secondary physical volume in response to the received first read command, and when unable to receive the read target data from the third storage apparatus, sending back, by the second storage apparatus, a second error message as the second response to the received third read command without performing reading from the second secondary physical volume in response to the received third read command.

* * * * *